Nov. 11, 1930.  J. H. ELDER  1,781,056
INDIVIDUAL PAN SUPPORTING DEVICE
Filed March 6, 1930
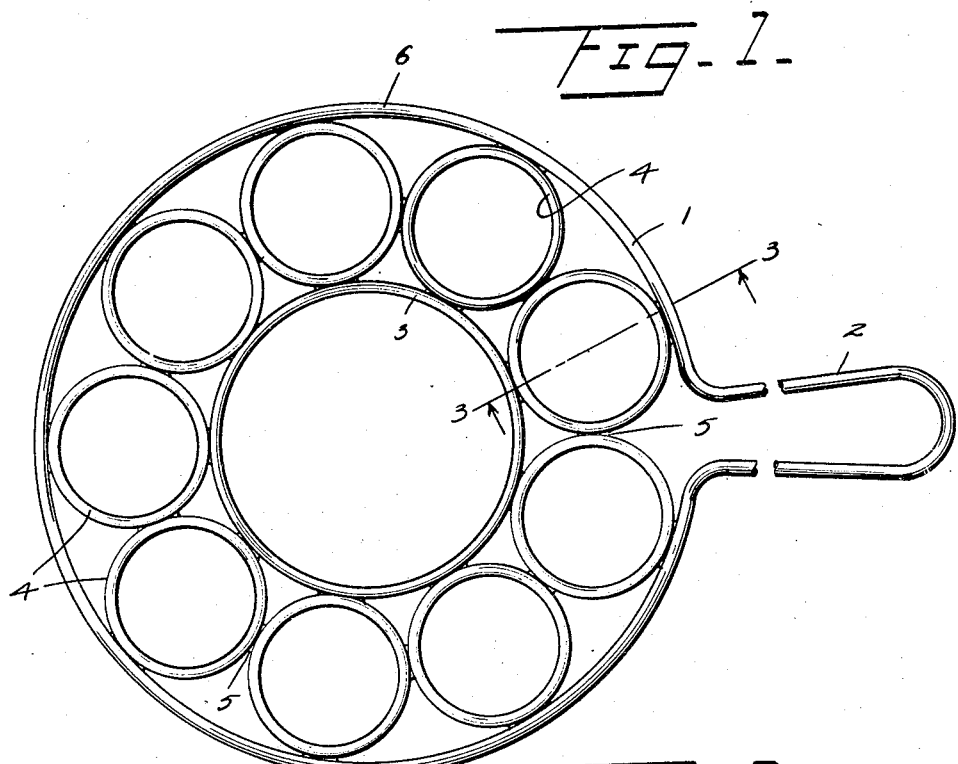
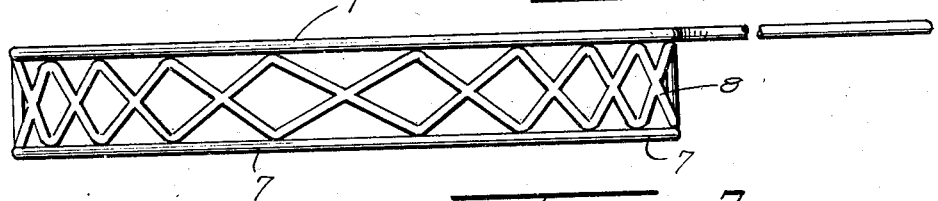
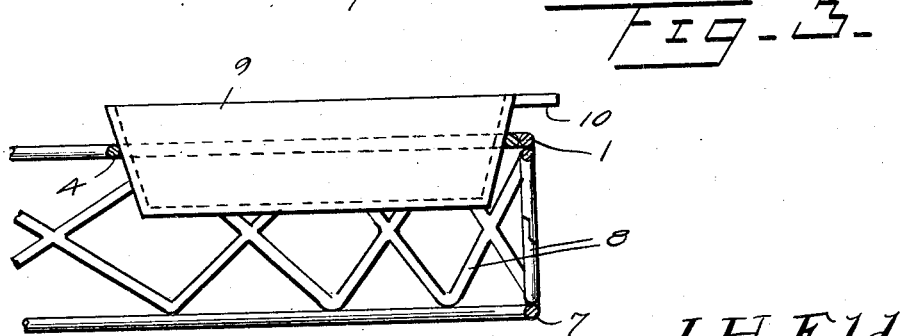
Inventor
J. H. Elder
By Watson E. Coleman
Attorney Patented Nov. 11, 1930

1,781,056

UNITED STATES PATENT OFFICE

JULES H. ELDER, OF MEMPHIS, TENNESSEE

INDIVIDUAL-PAN-SUPPORTING DEVICE

Application filed March 6, 1930. Serial No. 433,770.

This invention relates to improvements in kitchen utensils and pertains particularly to a device for supporting a plurality of frying pans of a size for frying individual eggs or other small orders.

The primary object of the present invention is to provide a device which will hold a number of small pans in place on a stove over a flame without allowing the pans to slide about or tip over.

In frying small orders where small frying pans are employed difficulty is experienced in keeping the pans upright for the reason that they slip down between the supporting members of the stove grate and tip over so that the contents thereof becomes partially or completely lost. For this reason it is frequently necessary to use a large pan for cooking small orders, as for example for frying single eggs or small quantities of other food when time and material might be saved by using a small pan which would just receive the quantity of food making up the individual order. In view of this it is an object of the present invention to provide a holding frame preferably constructed of wire of suitable gauge in which a number of individual frying pans may be mounted and placed in position over the flame upon the open grill or grate usually employed for supporting pans, without danger of the pans tipping over.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a top plan view of the pan holding device embodying the present invention.

Figure 2 is a view in side elevation of the same.

Figure 3 is a sectional view taken on the line 3—3 of Figure 1 showing an individual pan in position in the frame.

Referring more particularly to the drawing wherein like numerals of reference indicate corresponding parts throughout the several views, the numeral 1 indicates a frame of wire material of relatively heavy gauge bent into circular form and having an offset portion 2 constituting a handle.

Concentrically within the frame 1 is a wire ring 3 of materially smaller diameter than the frame and disposed between the inner and outer frames 1 and 3 is a series of small rings 4 which are in abutting relation one with the other and are welded together at these points as indicated at 5 and which also contact with the inner and outer frames to which they are welded as indicated at 6.

Disposed beneath and concentrically with the top frame 1 is a bottom frame 7 which is, of course, of circular formation and is of the same diameter as the top frame 1. The top and bottom frames 1 and 7 are connected by a lattice or grill work 8 which maintains the frames in the proper spaced relation and also permits a free circulation of heated air therebetween as will be readily understood.

As shown in Figure 3 an individual frying pan such as is indicated by the numeral 9, when placed in one of the outer rings 4, will be held in the proper horizontal position so that when the holding device is placed over the grate of a stove the pan 9 will be properly supported above the flame and will be held firmly against tipping. The center ring 3 which is of greater diameter than the outer rings 4 may have placed therein a larger pan so that larger orders may be taken care of or while an individual egg is being fried in one of the pans held in a frame 4 an order of bacon or potatoes or the like may be prepared in a larger pan in the center ring.

The pan 9 is provided with an extension 10 at the edge thereof by means of which it may be grasped and lifted from its supporting ring.

This extension 10 may be in the form of a flat lip with which may be engaged a grasping device of a suitable form such for example as a handle or lifter provided with a pair of spaced jaws which may be fixed or shiftable so that they may be engaged with the upper and lower faces of the extension.

From the foregoing description it will be readily seen that by providing a holder of the character shown in Figure 1 a relatively large number of individual orders may be prepared and all may be held in position over a flame without danger of being upset. It will also be readily appreciated that if only one or two orders are to be prepared a saving in material is effected for the reason that a large pan need not be used as would ordinarily be the case where considerably more of the frying grease or oil would probably be placed in the pan than necessary for the frying of a small order. It will, of course, be readily seen that without the holding device embodying the present invention the use of small individual pans upon a stove of the usual size where grates placed over the flame have large spaces between the bars thereof, would be impossible for the reason that the small pans would tip over into the spaces between the grate bars and thus lose their contents.

Having thus described my invention, what I claim is:—

A device for supporting a plurality of individual cooking receptacles, comprising a pair of annular frames disposed in superposed relation, a handle projecting from the upper one of said frames and forming an integral continuation thereof, a lattice like frame structure disposed vertically between and secured to said frames to maintain the same in spaced relation, and a plurality of connected annular frames disposed in the same plane as and within the upper one of the first mentioned frames, each of said last mentioned frames being designed to support a pan.

In testimony whereof I hereunto affix my signature.

JULES H. ELDER.